United States Patent [19]

Cosentino

[11] Patent Number: 5,097,499

[45] Date of Patent: Mar. 17, 1992

[54] AUTONOMOUS REGISTRATION OVERLOAD CONTROL FOR CELLULAR MOBILE RADIO SYSTEMS

[75] Inventor: Phyllis Cosentino, Streamwood, Ill.

[73] Assignee: AT&T Bell Laboratories, Murray Hill, N.J.

[21] Appl. No.: 570,948

[22] Filed: Aug. 22, 1990

[51] Int. Cl.⁵ .................................... H04M 11/00
[52] U.S. Cl. .................................. 379/59; 379/63
[58] Field of Search ............ 379/59, 60, 63; 455/33, 455/56

[56] References Cited

U.S. PATENT DOCUMENTS

| | | | |
|---|---|---|---|
| 4,670,899 | 6/1987 | Brody et al. | 379/59 |
| 4,726,014 | 2/1988 | Goldman et al. | 379/60 |
| 4,827,499 | 5/1989 | Warty et al. | 379/63 |
| 4,887,625 | 12/1989 | Felix | 379/59 |

Primary Examiner—James L. Dwyer
Assistant Examiner—Dwayne D. Bost
Attorney, Agent, or Firm—A. G. Steinmetz

[57] ABSTRACT

Registration signal channel overloads occurring due to overly numerous autonomous registration messages initiated by the mobile radiotelephones are averted by monitoring the number of autonomous registrations occurring or requested in a particular local cellular system and responding in the event of an impending overload by sending messages to specified mobile radiotelephones instructing them not to register at this time. The roamer mobile radiotelephones requesting registration within an area covered by a cellular system facing an impending overload are instructed, via an overhead message, not to register. Allowance of registration is not permitted until the overload condition is terminated. Alternatively the period between autonomous registrations is increased until the overload is cleared.

17 Claims, 9 Drawing Sheets

CELLULAR RADIO TELEPHONE SYSTEM

AUTONOMOUS REGISTRATION OVERLOAD CONTROL FOR CELLULAR MOBILE RADIO SYSTEMS

FIELD OF THE INVENTION

This invention relates to cellular mobile radiotelephone systems and to autonomous registration of mobile radiotelephones with a local cell site or fixed site base station. It is particularly concerned with the control of registrations during overload conditions occurring in a transmission channel handling these registrations.

BACKGROUND OF THE INVENTION

Autonomous registration is an overhead mobile radiotelephone locating function used in a cellular system to identify the mobile radiotelephones covered for service within a particular local cellular service system, e.g. a cellular geographic service area. Autonomous registration may be time based and/or geographic based. In time based autonomous registration, the registration of a mobile radiotelephone is in response to the passage of a time interval as defined by a clock. Geographic based autonomous registration is based on the location of the mobile radiotelephone; e.g. a roamer (e.g., a mobile radiotelephone away from its home territory) autonomously registers when it enters the territory of a new cellular system. Detailed particulars concerning the requirements and operation of autonomous registration in a cellular mobile radiotelephone system may be found in the published standard EIA-553.

Each mobile radiotelephone, when not engaged in making a call, continuously listens to a set-up channel with control information and sends overhead messages via a reverse signalling channel. System identification code signals generated by the base stations of the cellular system identify the presently serving cellular system to the mobile radiotelephone. These identification code signals include time stamp signals which are periodically incremented at some specific rate. In a time response autonomous registration each mobile radiotelephone compares a timed identification stamp or marker (REGID) received from the base station with a stored value of its next registration (NXTREG) which was calculated from parameters received in a previous overhead signal transmission.

If a mobile radiotelephone begins to lose reception of its present identifying code signal it searches for a new better quality identification code signal. If the new identification code signal indicates that the mobile radiotelephone system is in a new cellular service area, the mobile radio telephone automatically registers with the new base station.

In registering, the mobile radiotelephones send their serial number and related information to the local cellular service system over a reverse radio channel dedicated to transmitting overhead messages of this type. This reverse channel is normally used for a variety of purposes, e.g. control messages sent for the purpose of originating phone calls, in addition to the registration of mobile radiotelephones with the base station.

Since the transmission capacity of the reverse channel is limited, the need to process a large number of autonomous registrations will fill the reverse channel to capacity and block or severely limit transmissions of the other overhead messages that operate to originate calls and perform other support services.

SUMMARY OF THE INVENTION

Registration signal channel overloads occurring due to overly numerous autonomous registration messages initiated by the mobile radiotelephones are averted in accord with the principles of the invention by monitoring the number of autonomous registration messages occurring in a particular local cellular system and responding in the event of an impending overload by sending messages to specified mobile radiotelephones instructing them not to register at this time. In one particular illustrative implementation disclosed herein the roamer mobile radiotelephones requesting registration within an area covered by a cellular system experiencing an immediate or an impending overload are instructed, via an overhead message, not to register. Normal registration service is not resumed until the overload condition is terminated.

Additional features of the system to prevent autonomous registration message overloads include the capability to limit registration by homers (e.g., a mobile radiotelephone in its home territory) and roamers (e.g., a mobile radiotelephone in a foreign territory) to prevent an overload in the reverse channel by restricting the rates of autonomous registration. This is achieved in the illustrative embodiment by dilating the time of the generation of timing stamps on markers, e.g. REGID, by the local cellular access station and transmitting these altered timing markers to the mobiles so that the mobile radiotelephones experience a longer time interval between autonomous registrations.

These terminations of roamer and homer mobile radiotelephone registrations and dilations of roamer and homer registration timing marks is controlled by a stored program control which is operative to actively preserve sufficient capacity on the reverse channel for the call originations from mobile radiotelephone and other cellular overhead activities.

DETAILED DESCRIPTION

Figure 1:
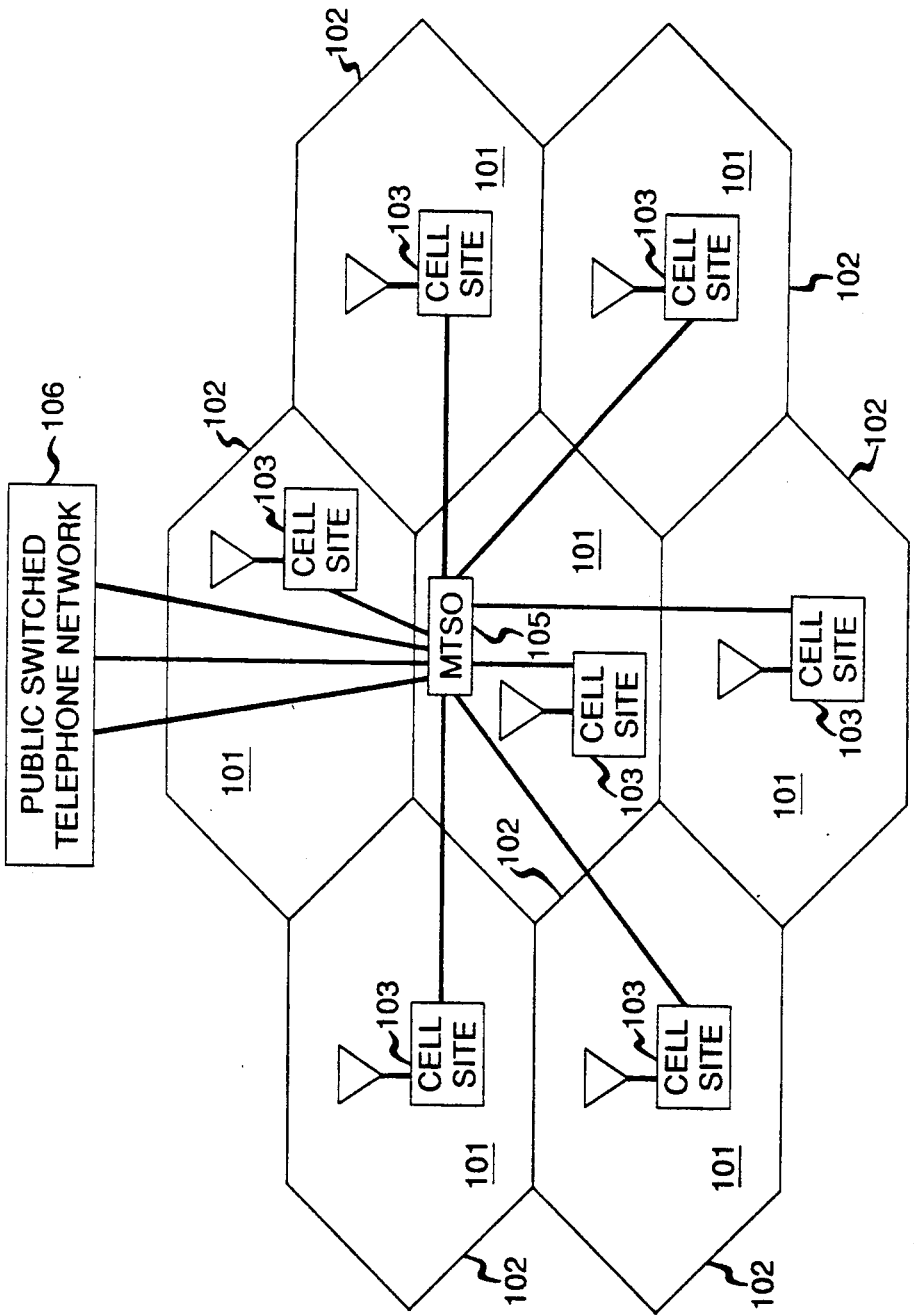
FIG. 1 is a schematic of a typical cellular system geographical layout.

A schematic of a typical geographical layout of a cellular radiotelephone system is illustrated in FIG. 1. The radiotelephone service area is divided into a plurality of cells 101 each covering a defined and substantially contiguous geographical area as illustrated by the geometric tiled hexagons 102. Each cell 101 includes a cell site 103 or base station which is a wireless communication and switching center for providing air communication with mobile radiotelephones. The cell sites 103 each include air radio communication equipment, including antennas, and land communication equipment including trunk connections to a mobile telephone switching office 105 which couples the cell site to a public switched land telephone network 106 which is typically the normal public switched telephone system. An understanding of this cellular concept may be attained from the article "The Cellular Concept" by V. H. McDonald, *Bell System Technical Journal*, January 1979, pages 15–41, Vol. 58, No. 1.

Figure 2:
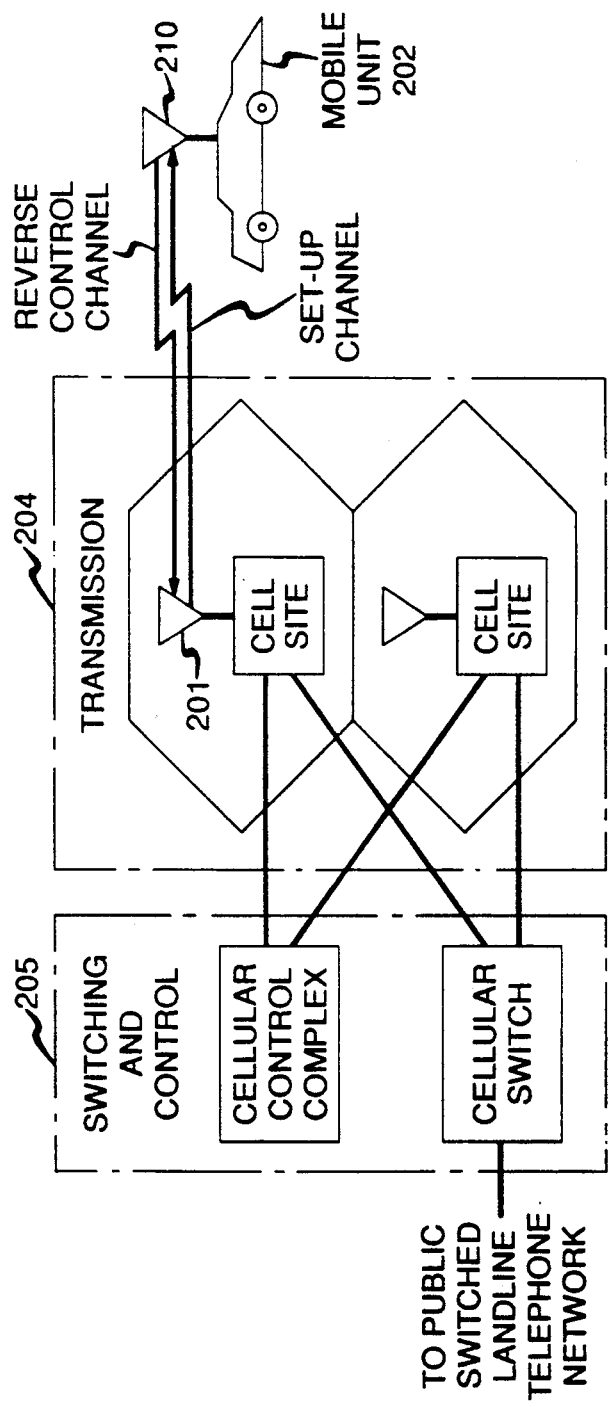
FIG. 2 is a schematic of the interconnections in a cellular radiotelephone system between a mobile radiotelephone and a telephone network.

A cell site communicates with a plurality of mobile radiotelephones via a plurality of different radio channels. Some channels are dedicated to voice transmissions and others are dedicated various overhead control message transmissions. In FIG. 2 an overhead air radio transmission channel 210 established between a mobile radiotelephone 202 and a cell site 201 is schematically illustrated. A radio channel for overhead messages directed from the mobile radiotelephone 202 to the cell site 201 is designated as a reverse control channel. Autonomous registrations are normally transmitted over this reverse control channel. Call setups, including cell site identification information, are transmitted from the cell site 201 to the mobile radiotelephone over a setup channel.

As shown in FIG. 2 the cell site 201 is connected with a plurality of other cell sites including cell site 204 to a switching and control MTSO 205 which is interconnected to a public switched telephone network. If the mobile radiotelephone 202 leaves the area covered by the cell site 201 and enters the area covered by the cell site 204, the mobile loses the setup and reverse control of cell site 201. The new identifying information on the corresponding set up channel of cell site 204 may cause it to register in the new cell. If on the other hand it remains in the cell area of cell site 201, the time information provided by the cell site 201 causes it to periodically register.

Figure 3:
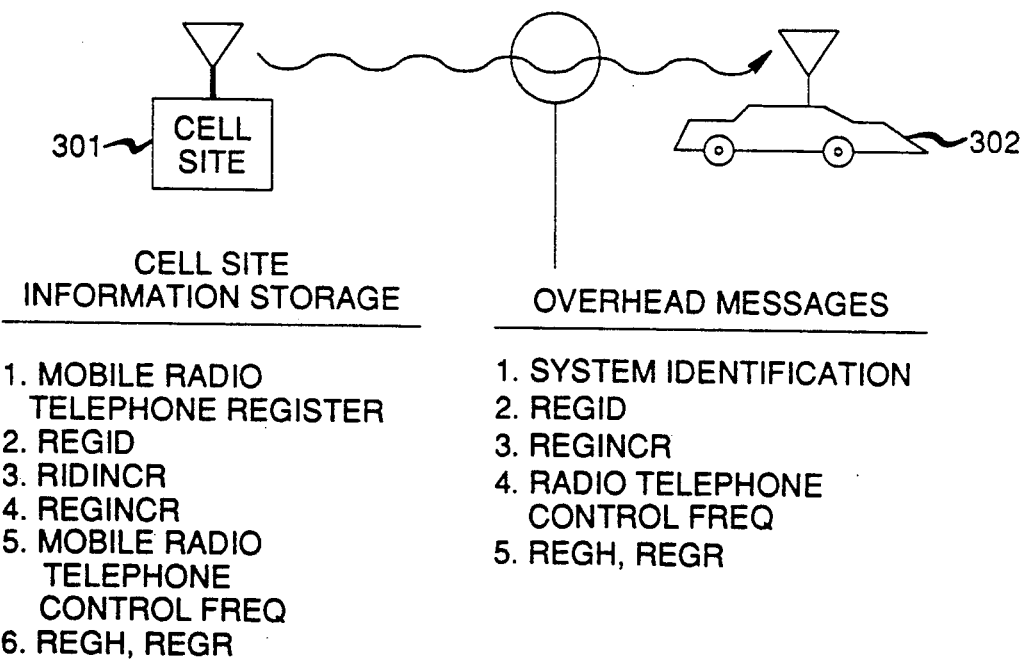
FIG. 3 is a schematic listing of the overhead messages and information involved in autonomous registration of mobile radiotelephones.

Registration is a procedure enabling a cell site to determine the identity of and the presence of mobile telephones within its geographical radio transmission boundary. Both the cell site and mobile radiotelephone store and transmit registration information. Each cell site 301 as shown in FIG. 3 maintains a register of the mobile radiotelephones 302 it services. Calls originating at the public switched land line network are connected to the dialed mobile radiotelephone through the particular cell site with which it is registered. The cell site 301 generates system identification, information and control signals such as shown in FIG. 3. It periodically transmits a system overhead message to the mobile radiotelephone which includes a system identification number (SID), a time stamped registration ID (REGID), a bit or flag enabling/disabling control defining the ability of the mobile radiotelephone 302 to register (REGH for homer mobile radiotelephones and REGR for roamer radio mobile radiotelephones) and a number REGINCR defining the maximum interval between registrations of the mobile radiotelephones 302.

Figure 9:
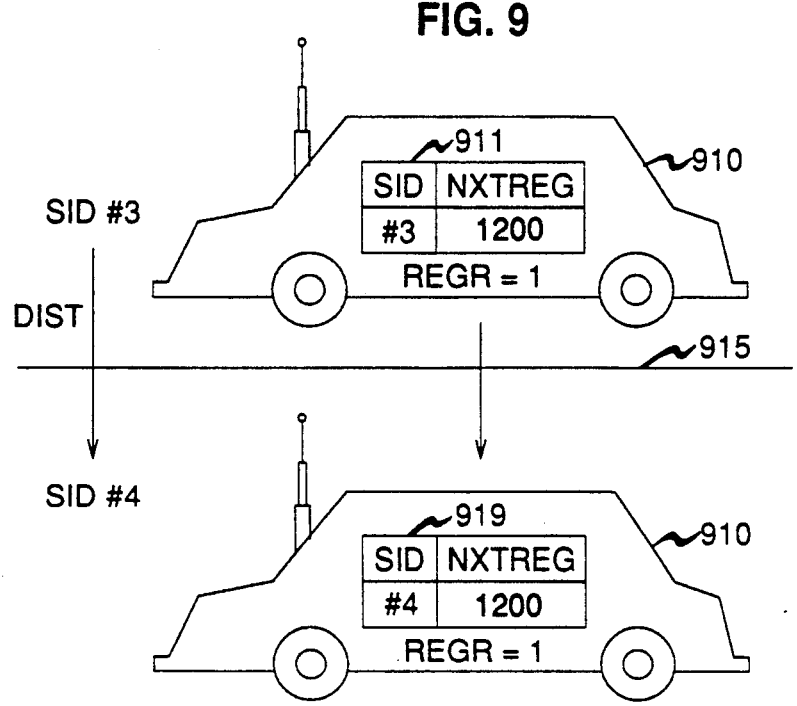
FIGS. 9, 10, 11 and 12 are schematics representing various aspects of a mobile radiotelephone overhead data storage content.

Each mobile radiotelephone unit 910, as shown in FIG. 9, stores the transmitted overhead message data in its mobile unit. This data includes certain data items concerning the system identification number (SID), the sum of the most recently transmitted time stamped registration ID (REGID) and the increment REGINCR, which establishes NXTREG, the next time of normal registration and the registration enabling/disabling control bits or flags (REGH;REGR). The storage of these system data messages is schematically shown for a roamer mobile radiotelephone 910 as shown in FIG. 9. The mobile radiotelephone unit 910 illustrated is presently registered in the system identified by the illustrative number #3. This identification number of the system is stored in its memory 911 and its ability to autonomously register is enabled since the flag REGR is set to an enabling one. The mobile crosses a geographic barrier 915 to a service area bearing a different identification (SID) number, e.g. #4 and the overhead signal channel is switched to a system #4 frequency. The mobile radiotelephone unit 910 autonomously registers in the new service area and stores the new identification (SID) number #4 in its memory 911.

Figure 10:
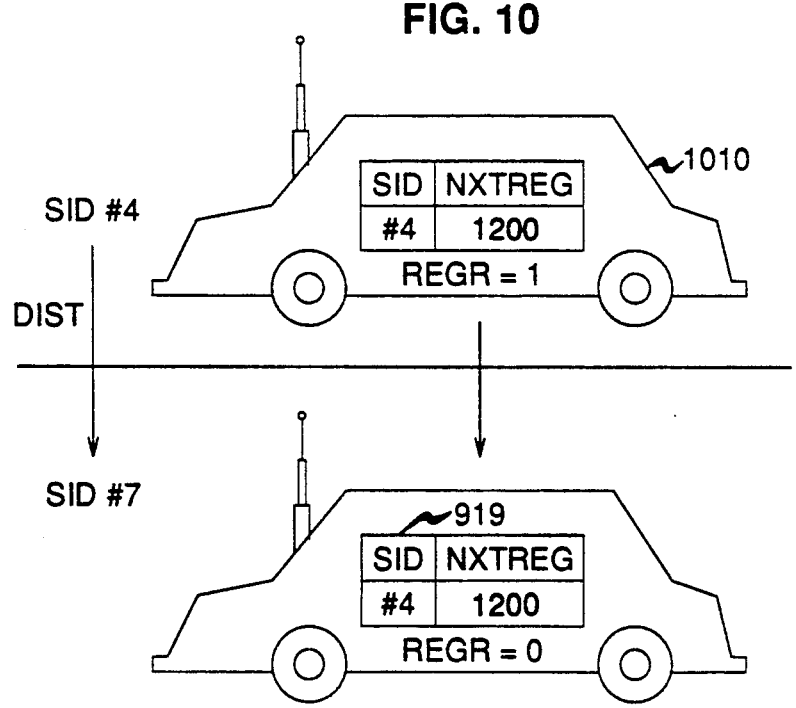

In FIG. 10 a roamer mobile radiotelephone unit 1010 has its registration enabling flag REGR initially set to one (enabling autonomous registration) and is in the service area identified by the illustrative identification number (SID) #4. It moves to a new service area #7, that is experiencing an overload in its overhead message transmission channels. This service area is hence transmitting autonomous registration disabling messages to the roamer mobile radiotelephones. The enabling flag REGR of the mobile radiotelephone is set to zero by the new system and the mobile radiotelephone is disabled from autonomous registration by the setting of the REGR flag to zero. Hence the mobile radiotelephone unit is prohibited from registering and its stored SID value is not changed.

Figure 11:
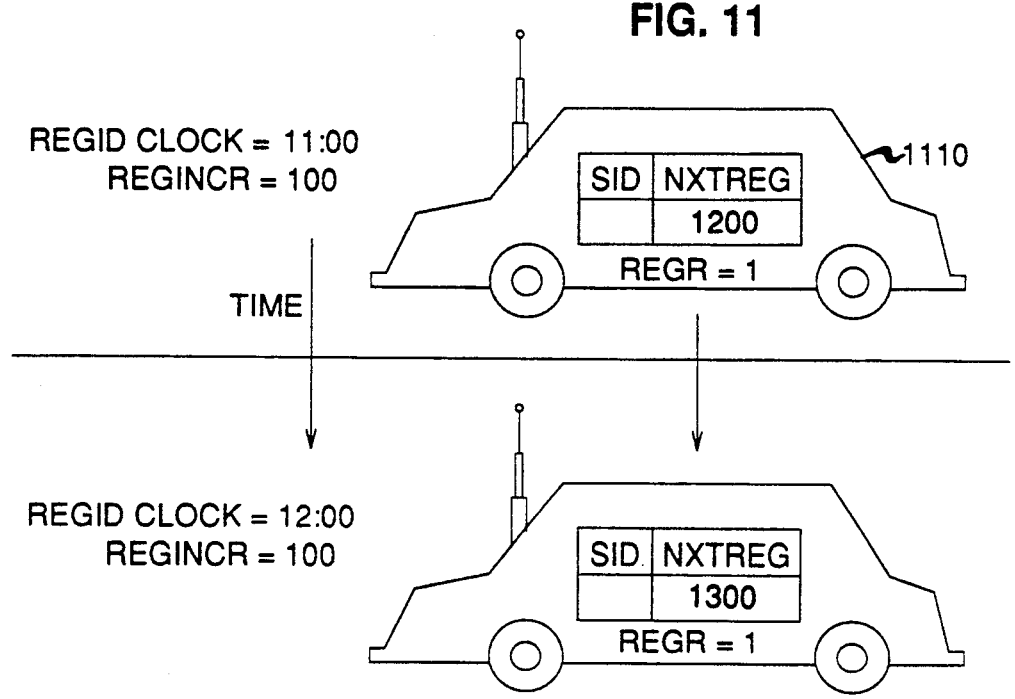
Figure 12:
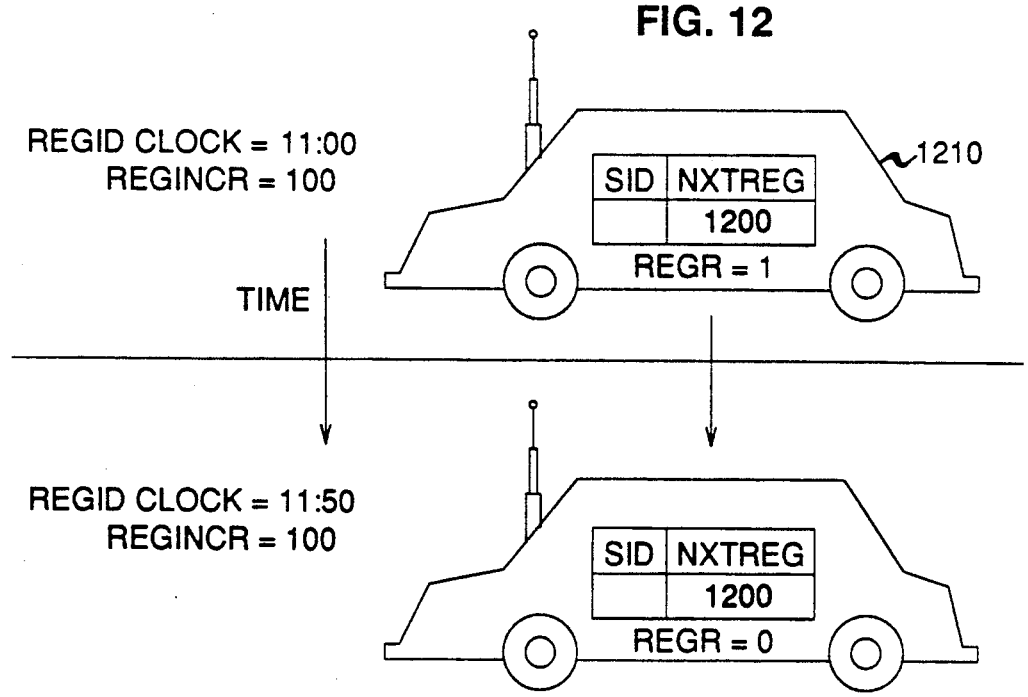

A homer mobile radiotelephone 1110, as shown in FIG. 11 is in a service area presently free of overloads on the overhead message channels. The present time is some illustrative value 1100 and the increment REGINCR is set at 100 thereby establishing the next registration time, NXTREG, at 1200 for this mobile radiotelephone. At the occurrence of 1200 at the normal increment rate the mobile radiotelephone autonomously registers with the system and inserts the new incremented time value NXTREG=1300 into its memory. In FIG. 12 an overload has resulted in the control equipment. The system for preventing autonomous registration overload slows the rate at which the REGID value is incremented. Accordingly the REGID value is not incremented sufficiently to permit the mobile radiotelephone to register at the occurrence of the actual time value 1200.

Figure 4:
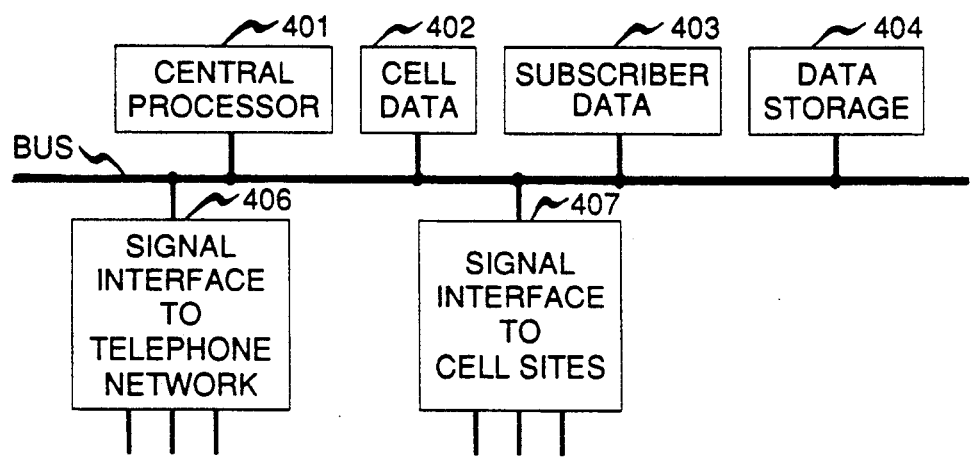
FIG. 4 is a block diagram of parts of a control system used in cellular systems for controlling autonomous registrations.

An MTSO site controller is shown in FIG. 4 and includes a central processor 401 which includes stored program controls to control the interface between the public switched telephone network and the cell site locations. Included are a cell data base 402 used for cell site control. Its data identifies the cells and their control functions. This data is used for various additional purposes such as radio channel management. A subscriber data base 403 permits location of roamer and homer mobile radiotelephone units by identifying the various homer subscribers both active and inactive and also maintaining a temporary data base of roamer subscribers being serviced. Additional data storage 404 is provided for cell management and cell maintenance functions. Signal interface 406 interconnects the MTSO with the public switched telephone network and the signal interface 407 connects it to the various cell sites.

Figure 5:
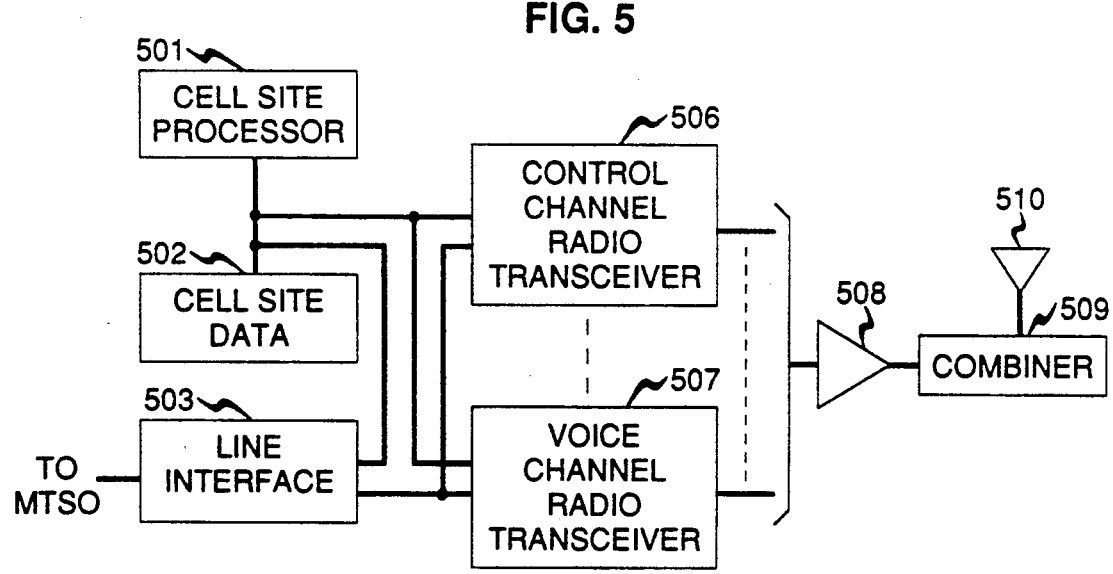
FIG. 5 is a block diagram of a cell site radio transmission system.

The cell site apparatus is disclosed in FIG. 5 and includes a local cell site processor 501 and a local data storage apparatus 502. The local cell communicates with the MTSO of FIG. 5, via a line interface 503, which is connected in turn to the radio transceivers of the radio frames 506 and 507 which are both under the control of the cell site processor 501. The processor 501 is operative to control message reception and transmission, setup channel control, and radio tuning. The radios include a control channel radio frame 506 and a voice channel frame 507. The autonomous registration functions are controlled through radio frame 506 over the setup and reverse control channels. An amplifier 508 and combiner 509 couple the radios of the frames 506 and 507 to an antenna 510.

Figure 6:
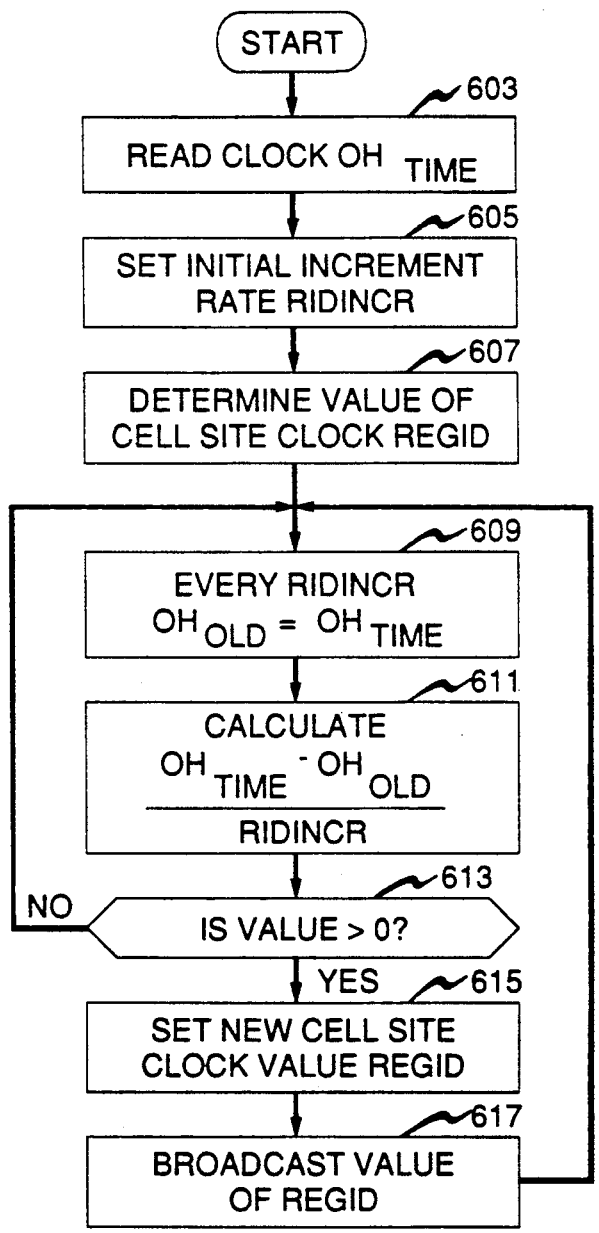
FIG. 6 is a flow diagram executed by the control system of FIG. 4 in handling messages between a radiotelephone and a cell site.

A flow chart delineating the registration process is shown in FIG. 6. The process begins by reading a continuous clock of the cell site (block 603) to establish the value $OH_{TIME}$ which represents the value of time presently maintained in the cell site control. An initial value is set for the rate RIDINCR at which the broadcast time stamp of the cell REGID is to be incremented (block605). The value of REGID is determined in block 607 by evaluating the function:

$$REGID = \frac{OH_{TIME}}{RIDINCR} \quad (1)$$

The present $OH_{TIME}$ is converted to the stored value $OH_{OLD}$ in block 609 and is used with a current $OH_{TIME}$ in the periodic calculation of block 611 in calculating the function:

$$\frac{OH_{TIME} - OH_{OLD}}{RIDINCR} \quad (2)$$

If the value of this expression is greater than zero (decision block 613) a new cell site clock value REGID is calculated in block 615 according to the following equation and substitutes a new stored value for REGID replacing the old value:

$$REGID = REGID + \frac{OH_{TIME} - OH_{OLD}}{RIDINCR} \quad (3)$$

RIDINCR is a registration ID increment rate which defines the time interval for incrementing REGID.

This new REGID value is broadcast throughout the cell area (block 617) and the flow routine returns to block 609 to determine a new value of $OH_{OLD}$. If the value of decision block 613 is no, the flow path returns to block 609 without broadcasting the REGID value to the mobile radiotelephones.

Figure 7:
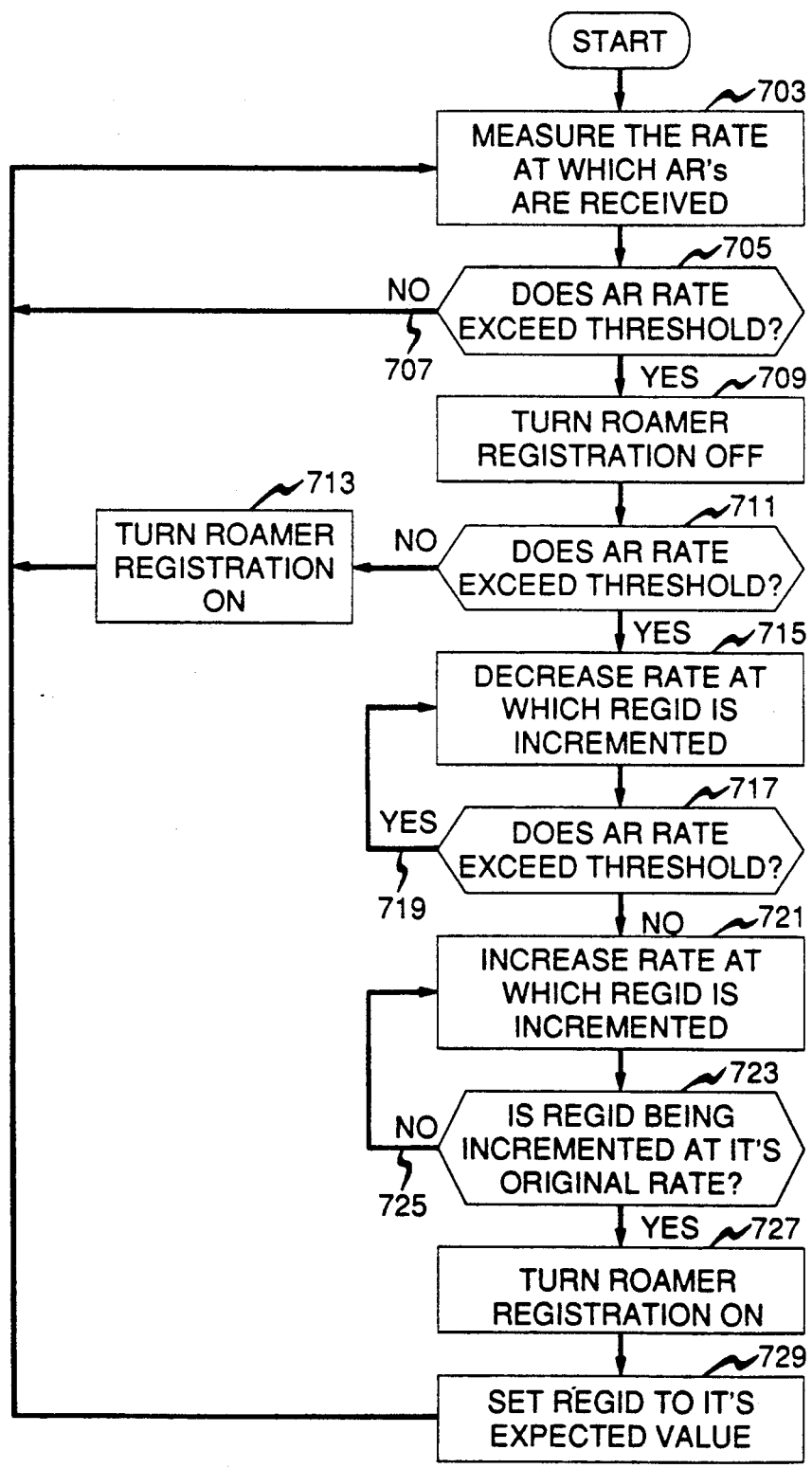
FIG. 7 is a flow diagram of a process included within the control system of FIG. 5 to prevent autonomous registration overloads.

A time based technique of preventing overloads in overhead message channels in a cellular radiotelephone system is disclosed in the flow chart of FIG. 7. The initial step (block 703) involves the measuring of the rate at which autonomous registration (AR) messages are received. A threshold of the autonomous registration rate is established usually in terms of the number of autonomous registration messages within a definite time interval. The step expressed by decision block 705 evaluates if that AR rate threshold has been exceeded. If the threshold AR rate is not exceeded the process flow path returns, via path 707, to the monitoring function as expressed by block 703. If the AR rate threshold, defined by block 703, has been exceeded as determined by the step enumerated in block 705 the autonomous registrations of all the roamer radiotelephones covered by the service area are inhibited by setting the flags REGR of each of the roamer radiotelephones to zero by means of an overhead control message broadcast to all the mobile radiotelephones.

The rate of autonomous registration messages is re-evaluated with respect to the AR rate threshold by the step enumerated in the decision block 711. If the rate of autonomous registration messages is below the threshold rate the autonomous registration of roamer radio telephones is again enabled, according to instructions enumerated in block 713, by setting the flags REGR of the mobile radiotelephones to a 1 value.

If the rate of autonomous registration messages is determined by the procedure of decision block 711 to exceed the threshold rate, the process flow continues to the block 715 which enumerates program instructions for decreasing the rate at which the time stamp REGID is incremented. The REGID increment rate is decreased by increasing the value of the registration ID increment rate RIDINCR to a new value RIDINCR*. The new values of REGID are designated REGID*. The value of the expression:

$$\frac{OH_{TIME} - OH^*_{OLD}}{RIDINCR^*} > 0 \quad (4)$$

must now be evaluated in terms of the new values of RIDINCR*. The value $OH^*_{OLD}$ is the value of time stored the last time REGID* was incremented. The new value of REGID* is determined by the following expression:

$$REGID^* = REGID^* + \frac{OH_{TIME} - OH^*_{OLD}}{RIDINCR^*} \quad (5)$$

The rate of autonomous registration messages is again checked, by the information of decision block 717 to see if the threshold AR rate is exceeded. If the AR threshold rate is exceeded the process flow continues, via flow path 719, to the block 715 whose delineated process step again decreases the rate at which the value REGID is incremented by the method described above.

If the rate of autonomous registration messages, measured in decision block 717, does not exceed the AR rate threshold the process flow continues to block 721 which is operative to increase the rate at which REGID* is incremented by decreasing the value of RIDINCR*. The rate of autonomous registration messages is compared to the original threshold rate by the instruction process of decision block 723. If the original rate of incrementing the standard REGID has not been attained the flow proceeds by path 725 to block 721 which again increases the rate at which REGID* is incremented. If the original rate at which the standard REGID is being incremented has been attained the flow proceeds to the instructions of block 727 which is operative to broadcast overhead messages to again enable the roamer radiotelephones to register by changing the REGR flag to a 1 value. The original sequence of REGID values has been continuously maintained by the stored control program during the overload protection process and this value is now again installed as the operative REGID by resynchronizing the temporary value REGID* with the actual value of REGID in the process step of block 729 and the process flow returns to the process at block 703.

Figure 8:
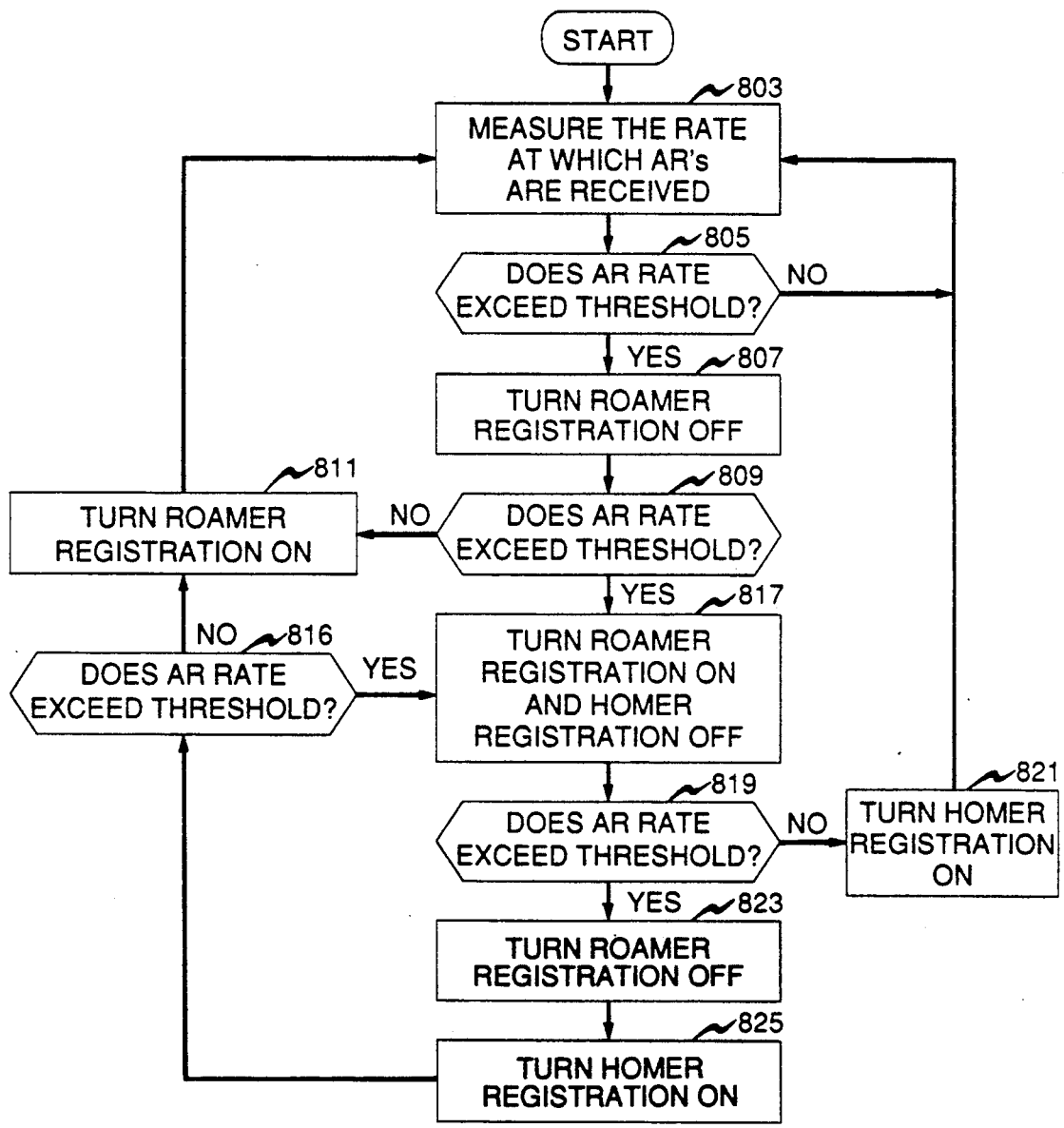
FIG. 8 is a flow diagram of another process included within the control system of FIG. 5 to prevent autonomous registration overloads.

An alternative geographic or system location based process for preventing an overload due to an excess of autonomous registration messages is disclosed in the flow chart of FIG. 8. The instructions defined in the block 803 have the process determine the rate at which the reception of autonomous registration messages is occurring. If the autonomous registration message rate exceeds the preset threshold AR rate, as per block 805, the roamer radiotelephones are disabled from registering by sending an overhead control message setting the REGR flag to 0 as per the instructions at block 807. The instruction of subsequent decision block 809 determines if the rate of autonomous registration messages still exceeds the threshold rate. If the AR rate is now under the threshold rate, as determined by instructions in decision block 809, the registrations of roamer radio telephones are again enabled by the instructions of block 811 and the flow path returns to block 803.

If the rate of autonomous registration messages continues to exceed the threshold rate, as per the instructions of decision block 809, the flow process proceeds to the instructions of process block 817. Here the autonomous registration of the roamer mobile radiotelephones is again enabled and the autonomous registration of homer mobile radiotelephones is disabled.

The rate of autonomous registration messages is again measured in decision block 819. If the threshold AR rate is not exceeded the autonomous registration of the homer mobile radio telephones is again enabled per the instructions of block 821 and the flow returns to process block 803. If the rate of autonomous registration messages continues to exceed the threshold AR rate the flow process continues to the process block 823 and the roamer mobile radio telephones are inhibited from registering by the instructions of block 823. The registrations of homer mobile radiotelephones are again enabled as per block 825. The flow continues to decision block 816 which determines if the threshold AR rate is exceeded. If the threshold AR rate continues to be exceeded by the autonomous registration message rate, the flow continues to process block 817 and the immediately preceding steps are repeated. If the AR rate is below threshold, the flow continues to process block 811 to again enable registration of roamer mobile radiotelephone and then returns to process block 803.

I claim:

1. A method of registration for mobile radiotelephones in a wireless telephone system in which mobile radiotelephones in a system identified area communicate over radio channels with a base station providing coverage of the system identified area and the wireless telephone system is coupled in turn to a land switched telephone network;
comprising the steps of:
instructing mobile radiotelephones to register over a designated overhead radio channel;
monitoring registration requests over the overhead radio channel;
identifying the attainment of an impending overload condition in autonomous registration requests by counting the number of registration requests within a defined time interval;
inhibiting acceptance of registration requests from mobile radiotelephones when the impending overload condition is identified.

2. A method of preventing autonomous registration overload in a cellular radio telephone system,
comprising the steps of:
counting the number of autonomous registration messages within an initial fixed time interval;
inhibiting registrations of roamer mobile radiotelephones if the number of autonomous registration messages exceeds a threshold count;
counting the number of autonomous registration messages in a fixed time interval subsequent to the initial fixed time interval;
allowing registrations of roamer mobile radiotelephones and inhibiting registrations of homer mobile radiotelephones if the number of autonomous registration messages exceeds a threshold count;
subsequently counting the number of autonomous registration messages in a sequence of fixed time intervals; and
alternately enabling and disabling allowance of registrations of homer mobile radiotelephones and roamer mobile radiotelephones as long as the number of autonomous registration messages exceeds a threshold count.

3. A method of preventing registration signal channel overloads in a cellular radio telephone system in which registrations of mobile radiotelephones are controlled in response to timing markers transmitted to the mobile radiotelephones by local cellular access stations;
comprising the steps of:
monitoring the number of autonomous registrations occurring within a set time interval in a particular local cellular system
determining if the occurrence of an overload due to the number of autonomous registrations has occurred;
in the event of the occurrence of an overload reducing the number of autonomous registrations by dilating the time of the generation of timing markers and transmitting these altered timing markers to the mobile radiotelephones.

4. Apparatus for controlling registrations of mobile radiotelephones of a cellular telephone system, comprising:
a radio communication station for coupling mobile radiotelephones with a land switched telephone network in which the radio communication station generates timing marks;
means for maintaining a list of mobile radiotelephones served by the radio communication station;
means for broadcasting the timing marks to mobile radiotelephones to cause available mobile radiotelephones within coverage area of the radio communication station to request registration permitting an update of the means for maintaining;
means for monitoring registration requests and determining if an overload condition occurs;
means for selectively preventing registration requests of the mobile radiotelephones if the means for monitoring determines an overload condition by dilating the time of generation of timing marks.

5. A method of preventing registration signal channel overloads in a cellular radio telephone system;
comprising the steps of:

monitoring the number of autonomous registrations occurring within a set time interval in a particular local cellular system;

determining if the occurrence of an overload due to the number of autonomous registrations has occurred;

in the event of the occurrence of an overload reducing the number of autonomous registrations, including a step of sending messages to roamer mobile radiotelephones instructing them not to register.

6. A method of preventing autonomous registration overload in a cellular radiotelephone system, wherein autonomous registration is responsive to a time dependent registration ID message whose value is periodically incremented;

comprising the steps of:

counting the number of autonomous registration messages within a time interval;

comparing the count with a threshold count; and increasing the period interval between periodic increments of the time dependent registration ID message when the count exceeds the threshold count.

7. A method of preventing autonomous registration overload as claimed in claim 6;

and further including the step of:

after the period interval has been increased repeating the step of counting the number of autonomous registration messages in a subsequent time interval; and further increasing the period interval between periodic increments of the time dependent registration ID message to a new higher value when the count exceeds the threshold count.

8. A method of preventing autonomous registration overload as claimed in claim 7;

and further including the step of:

continuously repeating the step of counting the number of autonomous registration messages in a subsequently occurring time interval; and defining a low count at which the period interval between periodic increments of the time dependent registration ID message is decreased.

9. A method of preventing autonomous registration overload in a cellular radio telephone system, comprising the steps of:

defining a registration ID message having a time stamp periodically incremented and broadcasting it to mobile radiotelephones;

counting the number of autonomous registration messages within an initial fixed time interval;

inhibiting registrations of roamer mobile radiotelephones if the number of autonomous registration messages exceeds a threshold count;

counting the number of autonomous registration messages in a fixed time interval subsequent to the initial fixed time interval;

increasing the period interval between periodic increments of the time stamp of the registration ID message to reduce a rate of autonomous registration messages from homer mobile radiotelephones when the count exceeds the threshold count;

periodically continuing to count the autonomous registration messages within further subsequent fixed time intervals; and subsequently continuing to further increase the period interval between periodic increments of the time stamp of the registration ID message when the count exceeds the threshold count;

reducing the interval between periodic increments of the time stamp of the registration ID message when the count is less than the threshold count; and restoring registrations of roamer mobile radiotelephones if the number of autonomous registration messages is less than the threshold count and the periodic interval has been restored to its initial value.

10. A method of preventing autonomous registration overload in a cellular radio telephone system, as claimed in claim 9;

and further comprising the steps of:

restoring the time stamp to a normal value independent of the periodic increments of the time stamp of the registration ID message implemented to limit autonomous registrations after access to autonomous registration has been fully restored.

11. A method of preventing autonomous registration overload in a cellular radio telephone system, as claimed in claim 10;

and further comprising the steps of:

restoring the time stamp to a normal value in periodic incremental steps.

12. A method of registration for mobile radiotelephones in a wireless telephone system in which mobile radiotelephones in a system identified area communicate over radio channels with a base station providing coverage of the system identified area and the wireless telephone system is coupled in turn to a land switched telephone network;

comprising the steps of:

instructing mobile radiotelephones to register over a designated overhead radio channel;

monitoring registration requests over the overhead radio channel, including a step of counting the number of autonomous registration requests within a defined time interval;

identifying the attainment of an overload condition in autonomous registration requests including a step of comparing the count to a preset threshold count; and inhibiting acceptance of registration requests from mobile radiotelephones when the overload condition is identified.

13. A method of registration for mobile radiotelephones in a wireless telephone system as claimed in claim 12;

wherein the step of inhibiting acceptance of registration requests from mobile radiotelephones includes: the step of inhibiting autonomous registrations of roamer mobile radiotelephones and permitting autonomous registrations of homer mobile radio telephones.

14. A method of registration for mobile radiotelephones in a wireless telephone system as claimed in claim 13;

further including the step of continuing to monitor autonomous registration requests of homer mobile radiotelephones;

counting the number of autonomous registration requests within a defined time interval; and inhibiting autonomous registrations of homer mobile radiotelephones if the number of autonomous registration requests counted exceeds a threshold count.

15. Apparatus for controlling registrations of mobile radiotelephones of a cellular telephone system, comprising:
- a radio communication station for coupling mobile radiotelephones with a land switched telephone network;
- means for maintaining a list of mobile radiotelephones served by the radio communication station;
- means for broadcasting instructions to mobile radiotelephones to cause available mobile radiotelephones within coverage area of the radio communication station to request registration permitting an update of the means for maintaining;
- means for monitoring registration requests and determining if an overload condition occurs, the means for monitoring and determining including means for counting registration requests within a time interval; and means for comparing the count with a preset threshold count.
- means for selectively preventing registration requests of the mobile radiotelephones if the means for monitoring determines an overload condition.

16. Apparatus for controlling registrations of mobile radiotelephones of a cellular telephone system as claimed in claim 15; comprising:
- wherein the means for selectively preventing registration requests of the mobile radiotelephones comprises:
- means for preventing registration requests from roamer mobile radiotelephones.

17. Apparatus for controlling registrations of mobile radiotelephones of a cellular telephone system as claimed in claim 16;
- wherein the means for selectively preventing registration requests of the mobile radiotelephones comprises:
- means for reducing a rate at which mobile radiotelephones are instructed to register.

* * * * *